United States Patent [19]

Heath

[11] Patent Number: 4,537,111

[45] Date of Patent: Aug. 27, 1985

[54] SYSTEM FOR AIDING NOTE TRANSPOSITIONS FOR STRINGED INSTRUMENTS

[76] Inventor: Joseph R. Heath, 884 Jeannette Ave., Baltimore, Md. 21222

[21] Appl. No.: 524,531

[22] Filed: Aug. 19, 1983

[51] Int. Cl.³ ............................................. G09B 15/02
[52] U.S. Cl. ....................................................... 84/473
[58] Field of Search .................. 84/417 SR, 473, 474, 84/480, 485 SR; 235/69, 70 R, 89 R

[56] References Cited

U.S. PATENT DOCUMENTS

| | | | |
|---|---|---|---|
| 264,932 | 9/1882 | Courter | 84/473 |
| 2,814,231 | 11/1957 | Jones | 84/485 |
| 3,572,205 | 7/1969 | Scholfield | 84/474 |
| 3,592,099 | 7/1971 | Yibley | 84/473 |
| 3,668,967 | 6/1972 | Malis | 84/471 |
| 3,748,947 | 7/1973 | Freiheit | 84/485 |
| 3,758,698 | 9/1973 | Matyas | 84/485 |
| 3,785,240 | 1/1974 | Hill | 84/485 |
| 3,894,465 | 7/1975 | Simmons | 84/485 |

FOREIGN PATENT DOCUMENTS 438358 12/1926 Fed. Rep. of Germany ... 84/471 SR

*Primary Examiner*—Benjamin R. Fuller
*Attorney, Agent, or Firm*—John F. McClellan, Sr.

[57] ABSTRACT

A note aid transposer for guitars and other instruments has a plurality of independent slides in a frame holding them parallel; each slide represents a separate string of an instrument; parallel with the slides but at the top of the frame a numbered fret array indication co-acts with equally spaced one-note measures therebeneath on a scale displaying the notes and below them the corresponding names of the notes; along the left side of the frame a slide retaining strip at a right angle to the fret array and overlying a portion of the slides in a position aligned with the left edge of the zero fret position has a separate open string notation for each slide; a similar strip lies to the right edge of the highest fret position but provides a different open string indication for the respective slides, which can project from either side of the frame for adjustment to the desired open string tuning position and thus indicate resultant note values at all fret locations.

1 Claim, 3 Drawing Figures

SYSTEM FOR AIDING NOTE TRANSPOSITIONS FOR STRINGED INSTRUMENTS

FIELD OF THE INVENTION

This invention relates generally to musical notations and specifically to slide-rule type musical note indicators for learning and for transposing musical scales and corresponding fingering positions.

SUMMARY OF THE INVENTION

A principal object of this invention is to provide a note finder system to be used as an aid in locating notes on the neck or fret board of conventional guitars, steel guitars, or other stringed musical instruments.

Further objects are to provide a system as described which will show the notes on each string as they progress upward at the frets, in scale notes as well as in note names.

In the prior art various slide type musical note devices have been described including those disclosed in the following U.S. patents:

U.S. Pat. No. 2,814,231 to V. L. Jones, 11-26-57, shows a complex semi-fingerboard slide rule type changeable chord finder that also indicates individual notes;

U.S. Pat. No. 3,592,099 to D. F. Gibby, 7-13-71, disclosed a circular slide rule type device for computing musical relationships;

U.S. Pat. No. 3,668,967 to A. Malis, 6-13-72, shows another slide rule device for indicating chords, that also fails to provide single string indications but sets off fret positions against strings;

U.S. Pat. No. 3,748,947 to R. E. Freihelt, 7-31-73, also is primarily concerned with displaying chords, in block-like slide rule configurations;

U.S. Pat. No. 3,758,698 to J. F. Matyas, 9-11-73, disclosed hand held apparatus simulative of a guitar fingerboard with frets along the top and a plurality of slides corresponding to strings along the length. The slides are positionable to represent different note values;

U.S. Pat. No. 3,785,240 to E. E. Hill, 1-15-74, shows another form of the type device indicating frets at right angles to an indication of strings, and slidably related;

U.S. Pat. No. 3,894,465 to L. E. Simmons, 7-15-75, disclosed a movable chord finder for guitar training having a plurality of slides. Open chords are shown at the sides of the frame and frets go from left to right. Selection of one chord positions the apparatus as a guitar for playing related chords.

Of the above and any other disclosures known, the one having potentially closest disclosure to the present invention seems to the inventor to be that disclosed in the above Matyas patent.

The Matyas patent teaches a housing with parallel slides in it at open string locations, and parallel with the slides numbered fret locations.

Each slide has names of notes of a scale along it, so that when the tuning of an instrument is known and the open string position of each slide is set, the corresponding notes across each respective fret are shown.

However, a mask confines the display to note names, and further, the slides have steps to prevent any part of them from passing beyond the end of the housing opposite that in which they are inserted, and still further the device must be inverted in some embodiments for full showing.

Applicant's invention provides substantial improvements over the above, as will be seen, in accordance with further objects of the invention, which include double-end slideout of the slides, two different open string displays, clear showing not only of each note name but also of the corresponding scale and note position on it, and further information, as will be seen.

BRIEF DESCRIPTION OF THE DRAWINGS

The above and other objects and advantages of this invention will become more readily apparent on examination of the following description, including the drawings in which like reference numerals refer to like parts.

DETAILED DESCRIPTION

Figure 1:
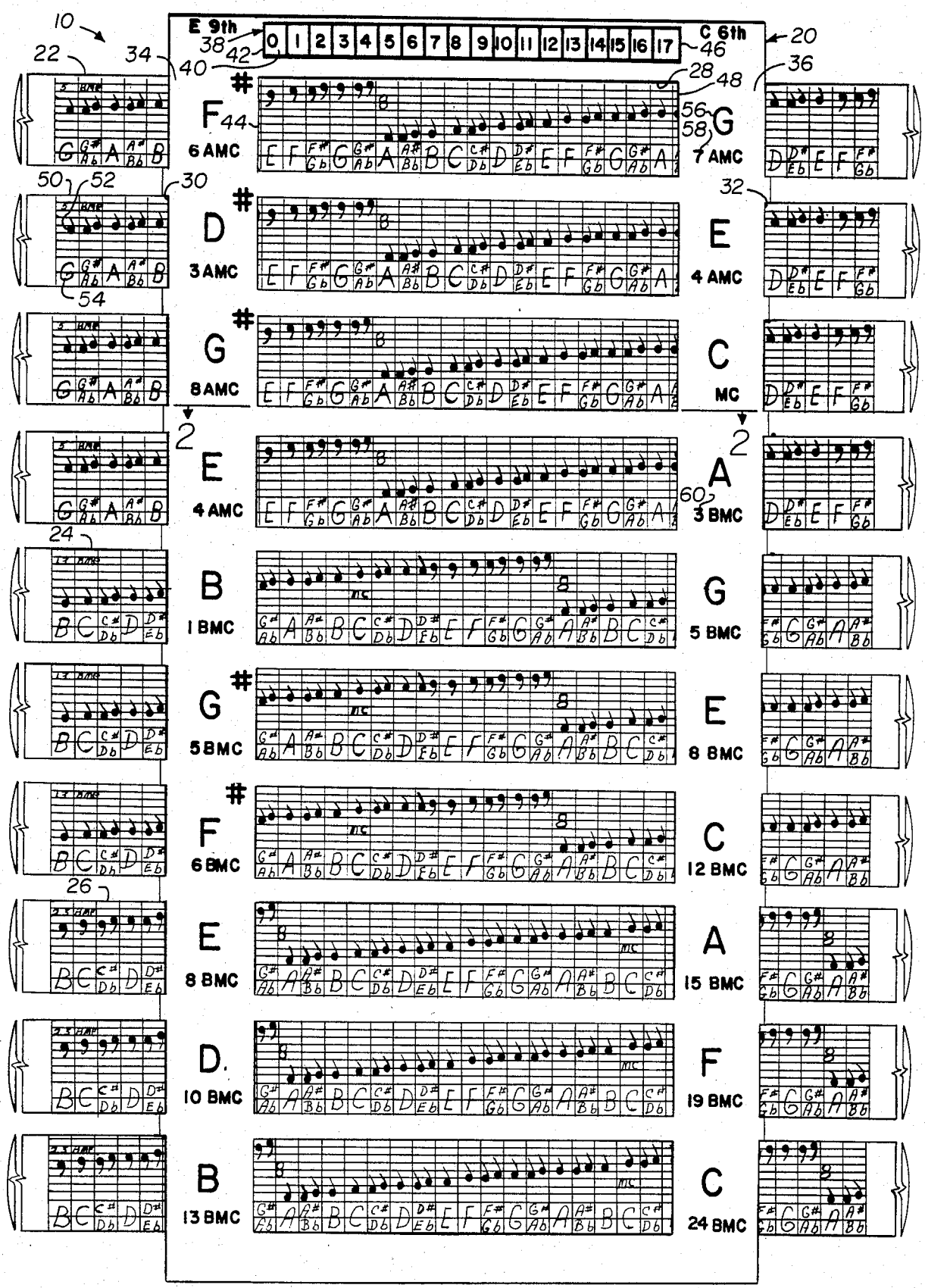
FIG. 1 is a face view of the invention, full scale except for the finger grips on the slides which may be longer, as indicated at the fragmentary portion.

FIG. 1 shows an embodiment 10. Frame 20 is rectangular in shape, and in the form of a flattened tube with a plurality of slides 22, 24, 26, indicated as selected samples. The slides are freely interchangeable to suit musical characteristics of the instrument being simulated. Means slidably mounting the slides in parallel comprise the slide structure defining a corresponding plurality of windows 28 in the frame, ten shown in this ten-string steel guitar embodiment and outboard each end of each window, structure defining a slot 30, 32, beyond a first strip 34 on the left and a second strip 36 on the right.

The windows and slots are substantially the height of the slides but enough greater to provide tolerance for sliding.

The slides may contain other conventional musical notations.

The frame has, across the top, means 38 parallel with the slides for simulating a spaced succession of stringed instrument fret locations 40, in numerical array. The first end 42 of this fret location simulating means is aligned with the inboard edge 44 of the first strip 34, and the second end 46 of the fret location simulating means is aligned with the inboard edge 48 of the second strip 36.

Each slide, 22 for example, has a succession of musical scale elements therealong on a spacing corresponding to the spacings between the simulated frets.

The musical scale elements include transverse divisions along each slide into measures 50 corresponding in length to the spacing of the fret locations, and on the scale a note 52 in the proper scale location, and below that the name 54 of the note.

At the location at which each of the first and second strips 34, 36 overlies a portion of a respective slide it has an appropriate open-string identification, 56, for example. These spaced open string designations follow in series on each slide, and the series on the first strip is preferably different from that on the second strip, together with provision that the slides can be slid freely to either side, making this a double-ended note transposition instrument.

Preferably each open string identification includes, MC, a locator 58, 60 to designate the number of notes above or below middle "C" shown.

The sliding scale of this invention is based on the great scale of music. By using a graduating scale of thirty-six half tones per slide, slides starting respectively at one of only four positions below middle "C", that is only four different slides, can cover the fret board of a ten-string steel guitar using eight lines of the original eleven of the great scale. An octave symbol is provided at each re-set of the graduating scale.

Figure 2:
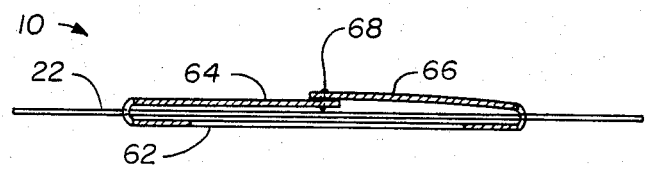
FIG. 2 is a sectional view adapted from 2—2, FIG. 1, but with the frame and the slide shown in proportion except that thickness is exaggerated.

FIG. 2 is a sectional view showing the flat tubular nature of the frame; the frame and the slides may be of plastic sheet or of high quality paper or of any other suitable material. A slide 22 is shown in position between the windowed front 62 and the folded-back overlapped margins 64, 66 in the rear, which may have staples 68 as means securing them together.

Figure 3:
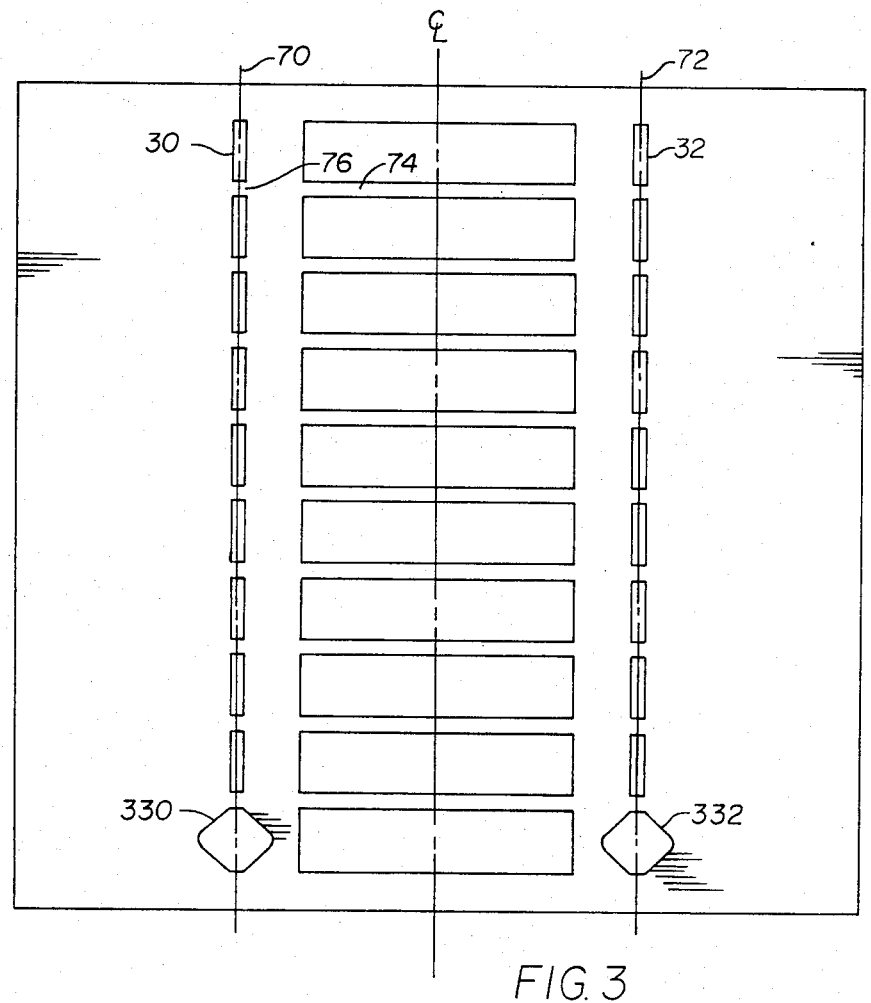
FIG. 3 is a face view on a reduced scale showing the blank from which the frame may be made.

FIG. 3 shows a typical blanked-out sheet ready for folding to make the frame. Fold lines 70, 72 go midway through slots 30, 32 on the respective sides. The structures 74, 76 defining the windows and slots serve to support the slides. The blank preferably is symmetrical about the centerline C-L.

In use, as indicated, once a particular note is aligned with the zero fret at an appropriate open string slide location, the remainder of the scale is easily read at the remainder of the fret locations.

Slots 330 and 332 show an optional variation which gives a larger slot for easier grasping of the slides.

This invention is not to be construed as limited to the particular forms disclosed herein, since these are to be regarded as illustrative rather than restrictive. It is, therefore, to be understood that the invention may be practiced within the scope of the claims otherwise than as specifically described.

What is claimed and desired to be protected by U.S. Letters Patent is:

1. In a system for aiding note transpositions for stringed instruments, said system having a frame, means on the frame slidably mounting in parallel a plurality of slides, the frame having means parallel with the slides for simulating a spaced succession of stringed instruments fret locations between first and second ends of said means for simulating, each slide having a succession of musical scale elements therealong on a spacing corresponding to the spacings of said means for simulating, the improvement comprising: first and second strips on the frame with each of said first and second strips overlying a portion of the plurality of slides, said first and second strips parallel-spaced a distance substantially aligning an edge of the first strip with the first end of the means for simulating and an edge of the second strip with the second end of the means for simulating; each of said first and second strips having thereon a succession of open string identifications spaced to coincide respectively with respective slides, each musical scale element including a measure corresponding in length to said spacing of the fret locations and in said measure a note on a scale and the name of said note, the entirety of each slide being visible except for said portion overlain by the first and second strips, each slide being freely slidable past the first strip and past the second strip, said frame comprising a unitary rectangular sheet, said means slidably mounting comprising structure of said unitary rectangular sheet defining a plurality of rectangular windows parallel with each other between said first and second strips and further defining a respective slot outboard each rectangular window, said unitary rectangular sheet having first and second inwardly folded margins, each fold being medianly through a respective said slot, means for securing said inwardly folded margins and forming a flattened tube of said frame, and said rectangular windows and slots having substantially the same height as said slides.

* * * * *